May 15, 1928.　　　　　　　　　　　　　　　　　　　1,670,094
W. A. BECKER
SWIMMING POOL
Filed April 4, 1927　　　　　3 Sheets-Sheet 1

INVENTOR.
Wayne A. Becker
BY
ATTORNEY.

May 15, 1928.  
W. A. BECKER  
1,670,094  
SWIMMING POOL  
Filed April 4, 1927  3 Sheets-Sheet 2

INVENTOR.  
WAYNE A BECKER  
BY  
ATTORNEY.

May 15, 1928. 1,670,094

W. A. BECKER

SWIMMING POOL

Filed April 4, 1927 3 Sheets-Sheet 3

INVENTOR.
WAYNE A. BECKER
BY
ATTORNEY.

Patented May 15, 1928.

1,670,094

UNITED STATES PATENT OFFICE.

WAYNE A. BECKER, OF COVINGTON, KENTUCKY, ASSIGNOR OF ONE-HALF TO S. L. KRING, OF CINCINNATI, OHIO.

SWIMMING POOL.

Application filed April 4, 1927. Serial No. 180,978.

The invention relates specifically to a circulating system for swimming-pools.

There are at least two important things generally required by the operators, as well as by the users of swimming-pools. One is the necessity of purity of the water, with respect to its freedom from germs and bacteria, and the other is the desirability of crystal clearness of the water.

Generally, the majority of bathers are of the opinion that clearness of the water indicates that it is pure. However, it is well known among persons who are familiar with the art that water which is crystal clear may be contaminated with species of germs and bacteria that are the most dangerous to human beings.

Heretofore, considerable difficulty has been experienced by the operators of swimming-pools, which accommodate a large number of persons, in maintaining the water at a high standard of purity and at the same time in preventing the accumulation of material, such as dirt and dust carried by the wind, silt, grass, leaves, particles of cuticle from the bodies of bathers, and other foreign matter suspended in the body of the water and on the bottom of the basin. Furthermore, in the pools where the growth of algæ makes progress, the feet of bathers tend to release it from adherence with the basin, or by the introduction of copper sulphate into the water the vegetation is released from adherence with the interior surface of the pool. Some of this vegetation remains suspended, in small particles, in the water and some of it sinks to the bottom, thereby producing a slimy sediment, which is quite readily agitated by action of the bathers, and caused to be mixed with the water.

Moreover, whether the unrestricted growth is algæ or is the kind that grows suspended in the water, or adheres to the bottom and sides of the basin, particles of it will float to the surface and form a green scum, which usually produces an objectionable odor and presents an undesirable appearance.

To remove undesirable deposits of sediment and suspended foreign matter from the water of a swimming-pool, it has been customary to drain the water therefrom and then thoroughly scrub the interior walls thereof, and in some instances the application of paint is deemed necessary. This procedure is irksome and the cost of fresh water is considerable. Moreover, the time required to drain the water, scrub and refill the basin involves several hours for each cleaning, during which periods the swimming-pool cannot be utilized as a source of pecuniary income from bathers. Furthermore, where the basin is provided with heated water, additional expenditure is required for fuel. And if the heat from the sun is depended upon to warm the water, several days generally are required for the water to absorb sufficient heat for comfortable bathing, after being filled with cold water.

A common source of trouble and expense for the operators of swimming-pools employing water filtering and purifying facilities has been the introduction of sterilizing agents, as chlorine, in the water in an effective manner to produce efficient results economically and with safety to the bathers, because it is well known that certain kinds of sterilizing agents are adapted to rise to the surface of the water, whereat the desirable effect is greatly lessened, if not decreased sufficiently to be ineffective for practical purposes.

The common and generally utilized method of purifying the water, with respect to germs and bacteria in a swimming-pool, has been to introduce, into the water, a sterilizing agent or germicide, as chlorine. It is therefore, disadvantageous to introduce the sterilizing agent near the surface of the water, because the very substance of the chemical results in its desirable components having a tendency to rise to the surface, whereby the lower water is not effectually purified. Furthermore, if the sterilizing agent is introduced into the water at the bottom of the pool, the necessity of its being quickly and thoroughly mixed with the water adjacent the bottom of the pool is readily apparent because, otherwise, the active agent tends to rise to the surface and is ineffective in producing the desired germicidal action in the portions of the water near the bottom which is not diluted with the germicide.

Therefore, it is obvious that the ideal circulating system for a swimming pool is one which is capable of simply, efficiently and economically effecting the combined results of uniformly sterilizing the water, and clarifying it both from the bottom and the surface, simultaneously.

Still another difficult task to accomplish satisfactorily has been to provide a circulating system whereby the water from the overflow gutter and side-walk drains is preserved and purified for reuse with the water that flows from the main-drain outlets.

Therefore, the important objects of the invention are to provide simple, efficient, practical and economical means for circulating and purifying the water, and by which the supply of the purified water is caused to be forced under pressure, from points near the bottom of the basin, and directed from the side-walls thereof in such a manner that the sterilizing agent is thoroughly mixed and distributed with the water adjacent the bottom of the basin, and simultaneously to create currents in said water, whereby deposits on the bottom of said basin, and foreign matter suspended relatively close to the bottom are carried toward and from an outlet in said basin, whereby the water is purified and clarified.

Other objects of the invention are to provide means whereby the water, which drains from the sidewalks adjacent the basin, is adapted to be returned through the filtering and purifying unit into the basin; to provide simple and efficient means, in the circulating system, for separating solid or foreign matter from the water conveyed from the overflow or scum gutter, sidewalk drains, and main-drain outlets; to provide means whereby the relative quantity of water which flows into the circulating system from the overflow gutter and sidewalk drains, or other drains supplied by the surface or near surface water, is restricted for the purpose of admitting into the circulating system, and from the main-drain, a predetermined proportion of the water normally in the circulating system, whereby the flow of water from the basin into the main-drain outlets is sufficient to effectually carry off solid and foreign substances from the bottom of the basin.

The invention resides in the combination of the elements, arrangement of the parts and in the details of the construction, as hereinafter specified and claimed.

I shall now proceed to explain, in detail, the structure and operation of the invention and the incidental parts thereof.

1 is the swimming-pool or basin which may be constructed from concrete or other suitable material comprising side-walls 2 and 3, end-walls 4 and 5, and bottom 6. Surrounding the basin is sidewalk 7 having therein side-walk or auxiliary drain outlets 8 connected by pipes 9, to drain pipe 10 which surrounds the basin and comprises a part of the effluent piping system A. The pipe 10 is inclined to direct the flow of water to section 11, of the pipe, adjacent end 5 of the basin.

Surrounding the basin is overflow gutter or scum-gutter 12, formed in the walls of the basin. The pipes 13 connect the overflow gutter with pipe 10. The pipe 10 is adapted to convey the water that drains from the side-walk, into auxiliary drain outlets 8, as well as the water that overflows from the surface of the pool into the overflow gutter.

For the purpose of forcing the water, under pressure, into the basin, the usual pump 14 is connected, by pipe 15, to the interior of the pit 16, as by the end 17 of the pipe being received in hole 18 in sidewall 19 of the pit. The source of supply from which the pit receives water is fully explained, hereinafter.

From the pump 14, the water is conveyed, by pipe 20, to water filtering unit 21, which is of usual and well known construction. After passing through the filtering unit, the water passes through pipe 21' into pipe 22 which surrounds the basin and comprises a part of the influent piping system B. The pipe 22 is connected, by pipes 23, to nozzles 24, embedded in recesses 25 in the sides 2 and 3, and end 4 of the basin, whereby the general current of the water in the pool is from the sides 2 and 3, and end 4, inwardly of the basin and toward the main-drain outlets 26 and 26' which are in bottom 6 and positioned in the deepest portion of the basin near end 5. The outer ends 27 of the nozzles protrude from the inner sides of the end wall 4, and side-walls 2 and 3.

The deepest portion of the pool being at the location of the main-drain outlets, the deposits, such as hair, leaves, silt, and other foreign matter on or in close proximity to the bottom 6, of the basin, is carried by the current of water toward and into the main-drain outlets connected by pipe 26''. Thus the bottom of the basin is effectively cleaned of the different kinds of sediment, as by the continuous currents of water traveling from the sides 2 and 3 and end 4 of the basin into the main drain outlet.

The impurities and foreign matter which float thereon, are carried by the surface water into overflow gutter 12 and thence through pipes 13 and 10 into section 11 of the latter pipe.

Having connection with section 11, of pipe 10, is restriction pipe 28 which has connected thereto pipe 29 having its end 30 received in hole 31 in the wall 32 of equilibrium pit or control 16, whereby water from the overflow gutter 12 and side-walk drains 8 is adapted to be received in the pit comprising integrally formed side-walls 32, 33, 34, and 19, and bottom 35.

Connected with the main-drain outlet 26, is pipe 36 having connection with float valve 37, through pipe 38 having its upper end 39 received in hole 40 in side-wall of pit 16. The float valve 37 is of any well known type or construction such as a butter-fly valve.

The pipe 36 is extended to the usual sewer, whereby manual operation of valve 41 is adapted to permit the water to drain from the basin. The valve 41, however, remains closed when the water circulating system, comprising influent system B, and effluent systems A and D are in operation.

The valve 37, connected with the end 39 of pipe 38, is operatively connected with float 42, whereby the level of the water in the pit 16 is adapted to regulate the quantity of the water which flows from the main drain outlets 26 and 26' into the pit. The valve 37 is adapted to gradually open as the gradually receding level of the water in the pit lowers the float, thereby permitting an increased flow of water from the main-drain outlets in direct proportion to the lowered level of the water in the pit. It is apparent that the valve 37, of any usual construction adapted to accomplish the intended purposes, will automatically control the flow of the water from the main drain outlets since the passage through the valve communicates with the main-drain outlets, and the level of the water in the pit, which operates the valve, is dependent upon the quantity of water that flows from the overflow gutter and the sidewalk drains. The valve gradually closes to permit a less quantity of water to flow into the pit, from main-drain outlets, as the level of the water in the pit is raised by flow of the water from the upper effluent systems.

The purpose of the valve 37 is to provide, under all circumstances, a sufficient supply of water in the pit 16 to equal or be slightly more than the capacity of the pump 14, thereby preventing the pump from sucking air when the quantity or flow of the water from the pit into pipe 10 is greatly reduced or entirely stopped. The capacity of pump 14 is equal to or slightly less than the capacity of the water received into the pit from the main-drain outlets, when the valve 41 is completely open to supply all of the water received by the pit when no water flows into the pit from the pipe 10.

As the capacity of water, received by pipe 10 from the overflow gutter 12 or from sidewalk drains 8, or from both is increased, the level of the water in the pit is raised, whereby the float 42 is raised, thereby gradually closing off the flow of water from the main drain outlets, thereby supplying the pit with sufficient water to approximately equal the capacity of the pump.

It is desirable, however, never to restrict the flow of water, beyond a predetermined capacity, from the main drain outlets, as sufficient water must flow from the bottom of the basin to carry off the sediment.

Generally, it has been my practice to arrange the mechanism so that the quantity of water received from pipe 10, into the pit, is not more than one half of the total capacity of pump 14. To accomplish this purpose the size of pipe 10 may be restricted to effect this result, or the size of the opening in restriction-pipe 29, connected with pipe 28 may be formed to effect the desired result. The overflow pipe 43 is received through bottom 35 of the pit, and is connected with pipe 36 to permit the water to escape and prevent pit 16 from overflowing, if the pump 14 fails to operate totally, or at its full capacity.

Figure 2:
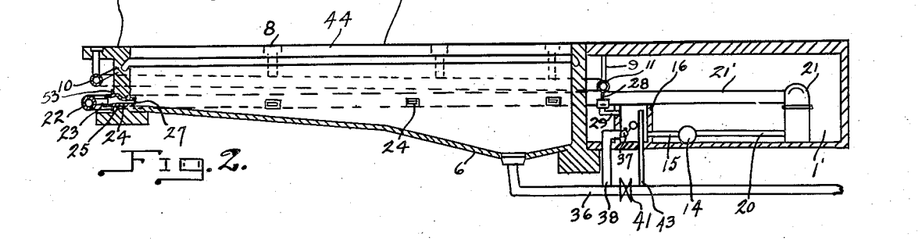
Fig. 2 is a section taken on a line corresponding to 2—2 in Fig. 1.
Figure 3:
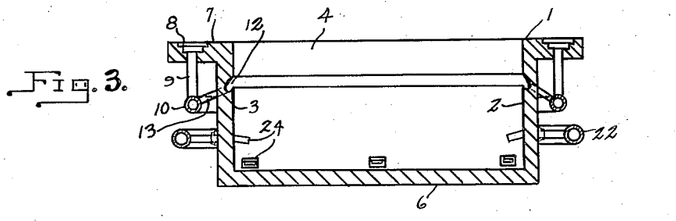
Fig. 3 is a section taken on a line corresponding to 3—3 in Fig. 1.
Figure 4:
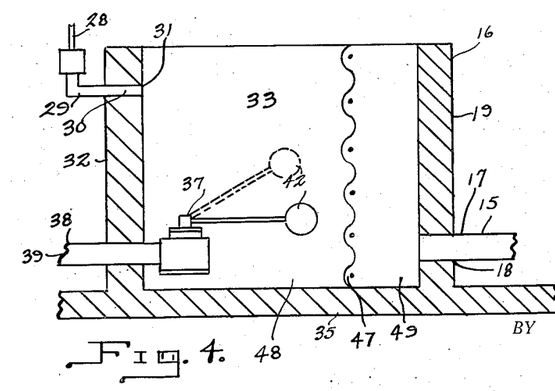
Fig. 4 is a vertical section of the pit.

In Figs. 2 and 3 the nozzles 24, embedded in sides 2 and 3 of the basin, are shown arranged aligned parallel with the top 44 of the basin (which is parallel with the ground), and with their ends 27 inclined downwardly, whereby the water is forced therefrom at a downwardly inclined angle toward the bottom of the basin. The nozzles 24, in the end 4 of the basin, are shown arranged aligned parallel with the top of the basin, and with their end 27 extending parallel with the top of the basin, whereby since the bottom 6 is inclined downwardly from end 4 to main drain outlets 26 and 26', the water forced from the nozzles is directed toward and into the main drain outlets by the downward current effected by the nozzles in the side-walls.

Figure 5:
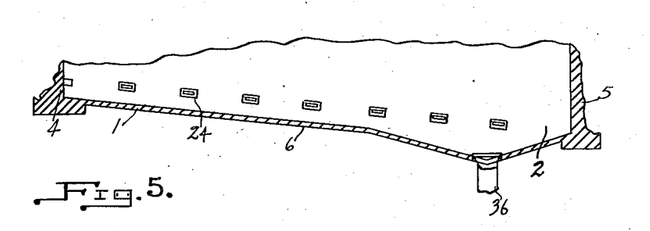
Fig. 5 is a vertical longitudinal section of the basin showing a modification, and with parts broken away.

In Fig. 5, is shown nozzles 24 in the side walls arranged aligned at a downward inclination, with respect to the top of the basin, and the water is directed therefrom in a direction parallel with the bottom of the basin. The nozzles in the end wall 4, also, direct the water parallel with the bottom of the basin.

Figure 11:
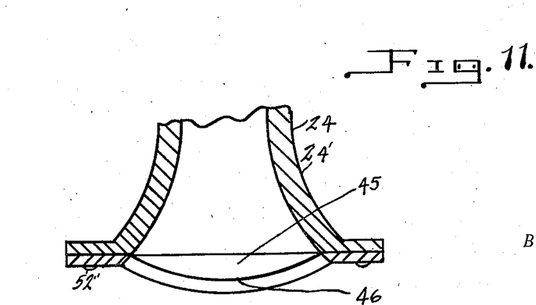
Fig. 11 is a section taken on a line corresponding to 11—11 in Fig. 10.

In Fig. 11, is shown a longitudinal transverse section of nozzle 24, which shows the outlet 45 diverging inwardly from its outer end 46, whereby the water is forced in fan-shape formation into the pool thus importantly increasing the area covered by the currents produced by the water ejected from the nozzles, whereby when the sterilizing agent is introduced into the influent piping system B, by application into the pit or into the pipe line in close proximity to the filters, the germicide is distributed in various directions inwardly of the walls of the basin and in parallel relation to the bottom. The sterilizing agent then is free to rise upwardly and out of control of the currents which carry the solid matter on the bottom of the basin, and other foreign substances suspended near the bottom, toward and into the main drain outlets.

The strainer 47 divides the pit into two compartments 48 and 49, whereby the larger solids received from compartment 48 of the pit, from pipes 29 and 38, is adapted to be separated from the water pumped, by pump 14, through pipe 15 from compartment 49 of the pit.

If desired, one or more of the nozzles 24 may be embedded in end wall 5, of the basin, and directed to produce currents toward end wall 4, although if this is done, care must be exercised to select nozzles having suitable sized outlets to guard against the currents thus produced acting disadvantageously against the currents which flow from end wall 4 toward main drain outlets 26.

Figure 6:
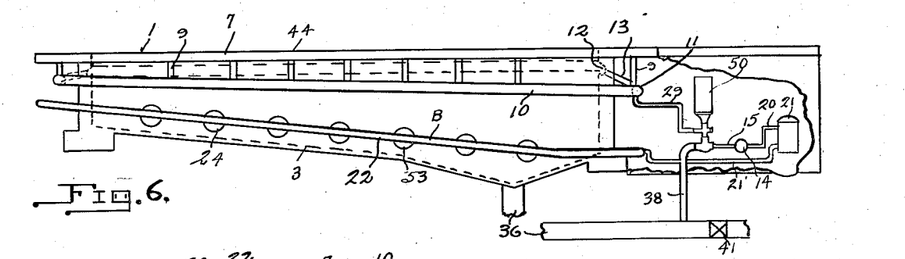
Fig. 6 is a side elevation of the basin with parts broken away.
Figure 7:
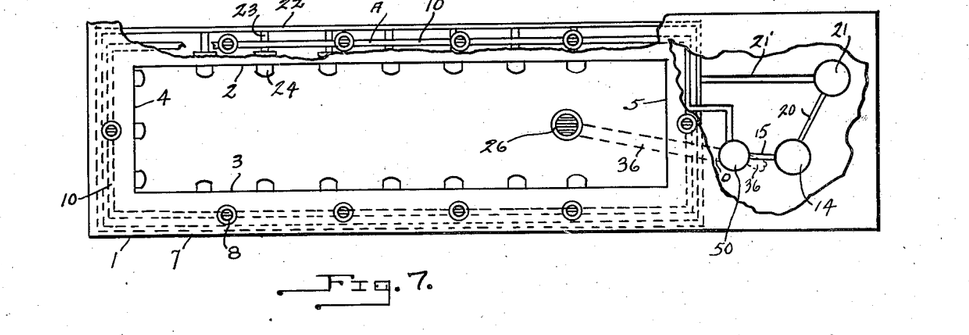
Fig. 7 is a plan view of the structure shown in Figs. 5 and 6, with parts shown broken away.
Figures 8, 9, 10:
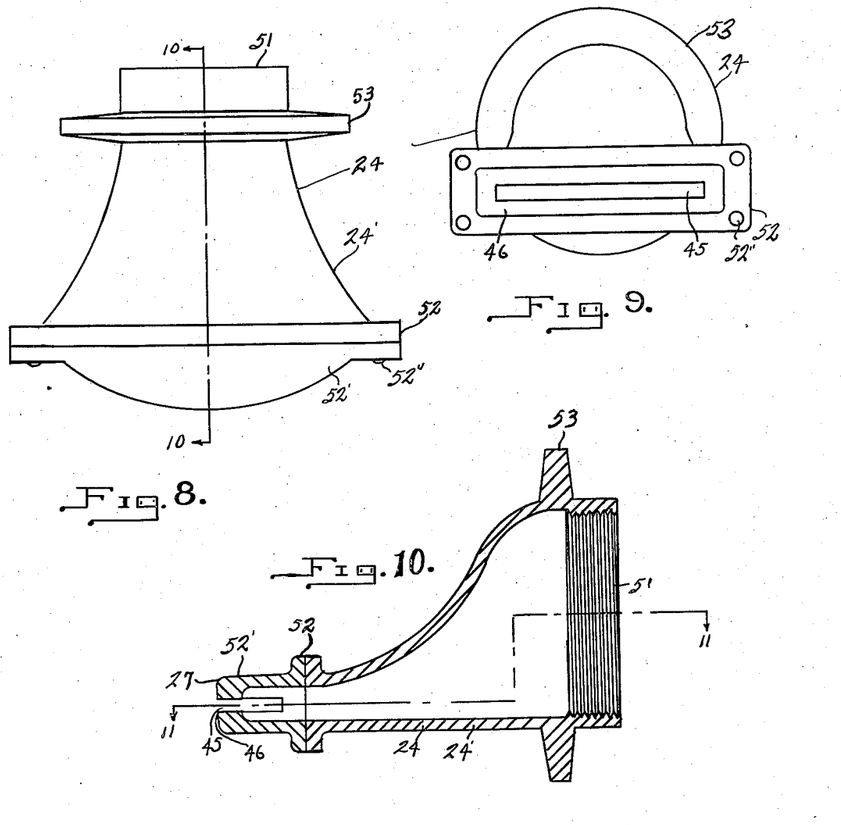
Fig. 8 is a plan view of a nozzle.
Fig. 9 is a front elevation of the same.
Fig. 10 is a section taken on a line corresponding to 10—10 in Fig. 8.

In Figs. 6 and 7, is shown control valve 50 substituted for float valve 37. The control valve 50 is thoroughly described in my application Serial No. 132,411, filed August 30, 1926. Its purpose is to control the quantity of water which flows, over a given period, from the main water drains 26 and 26', by regulation effected and dependent upon the quantity of water received from pipe 10.

Figure 1:
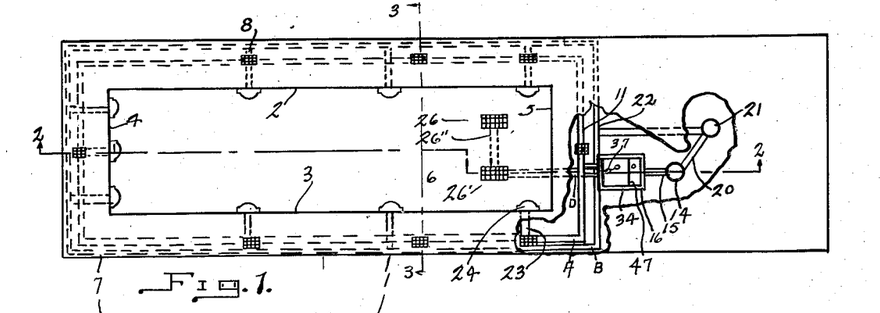
Fig. 1 is a plan view of the basin, sidewalk and filtering equipment compartment, showing parts broken away, and with certain of the elements shown diagrammatically.

The arrangement of the effluent systems A and D and the influent system B, in Figs. 5, 6 and 7 is slightly modified from the structure shown in Figs. 1, 2 and 3, but the general arrangement is the same.

In Figs. 8 to 11 inclusive, is shown various views of nozzle 24. The nozzles have internal threads 51 which are adapted to receive the corresponding threaded ends of pipes 23. The outlet end 52' of the nozzle is releasably fixed, by bolts 52'', to body 24', whereby when desirable the outlet end 52' may be removed for the purpose of removing refuse from the interior of the nozzle. It is preferable to embed boss 52 of the nozzles in the inner surface of the side walls of the basin 1. The flange 53 may engage the outer surface of the side walls of the basin, as shown in Figs. 2 and 6.

In Figs. 1 and 2 the pit 16, pump 14, filtering unit 21 and a portion of the piping systems are shown in chamber 1' below the level of the top of the basin. If preferred, the pit 16 may be utilized with its top level with the top of the basin. This arrangement is particularly desirable where the pumping and filtering apparatus are positioned above the level of the ground. The control valve 50 may be used under the same or similar circumstances.

An important advantage of the invention is that, in pools where it is desirable to heat the water before permitting it to re-enter the basin from filtering unit 21, the effect of the structure and arrangement of nozzles 24 is to thoroughly mix the heated water with the colder water near the bottom of the basin. The heated water is adapted to rise to the surface as a result of which the water in the basin is maintained at a uniform temperature, thus avoiding the colder portions or "spots" so common in swimming-pools which receive water by means of usual systems.

Another advantage of the circulating system, as shown and described, is that when the water in the pool becomes cloudy, caused by the presence of suspended matter therein, a coagulant, as alum, may be introduced into the water thus causing the foreign matter to be precipitated to the bottom. The specific gravity of the precipitated matter is slightly higher than the specific gravity of water and, therefore, it is quite readily carried, by the currents produced by the invention, toward and into the main drains. Otherwise, when the water is undisturbed, this precipitated matter settles to the bottom of the basin and produces a slime which is readily distributed through the water by action of the bathers. The presence of this suspended matter in the water is highly undesirable, because its appearance indicates to persons, who are unfamiliar with the scientific methods of purifying water, that the water in the pool is contaminated with bacteria and impure matter.

It will now be apparent that I have devised a novel and useful structure, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention, or sacrificing any of its advantages.

What I claim as new and desire to secure by Letters Patent is:

1. A circulating system for swimming-pools including in combination an overflow gutter surrounding the pool, an influent piping system arranged near the bottom of the pool, an effluent piping system arranged near the top of said pool and communicating with said gutter, an effluent piping system arranged at the bottom of said pool and communicating therewith, piping connections, including a pump, establishing communication between said systems, and a common means to receive the water from said effluent piping systems, and means adapted to control the quantity of water delivered from said second mentioned effluent system.

2. A circulating system for swimming-pools including in combination an overflow gutter surrounding the pool, an influent piping system arranged near the bottom of the pool, an effluent piping system arranged near the top of said pool and communicating with said gutter, an effluent piping system arranged at the bottom of said pool and communicating therewith, and piping connections, including a pump, establishing communication between said systems.

3. A circulating system for swimming-pools including in combination an overflow gutter surrounding the pool, an influent piping system arranged near the bottom of the pool, an effluent piping system arranged near the top of said pool and communicating with said gutter, an effluent piping system arranged at the bottom of said pool and communicating therewith, piping connections, including a pump, establishing communication between said systems, means to receive the water from said effluent piping systems, automatic means adapted to control the quantity of water delivered over a given period from said second mentioned effluent system to said pump, the said quantity being dependent upon the flow of water received from said first mentioned effluent system.

4. A circulating system for swimming-pools including in combination an overflow gutter surrounding the pool, an influent piping system arranged near the bottom of the pool, an effluent piping system arranged near the top of said pool and communicating with said gutter, an effluent piping system arranged at the bottom of said pool and communicating therewith, piping connections, including a pump, establishing communication between said systems, means to receive the water from said effluent piping systems, means adapted to control the quantity of water delivered over a predetermined period from said second mentioned effluent system to said pump, the said quantity being dependent upon the quantity of water received over a period from said first mentioned effluent system.

5. In a circulating system for swimming-pools, an overflow gutter for receiving surface water, a main-drain outlet for receiving water from the bottom of said pool, a plurality of nozzles adjacent said bottom and having their outlets directed inwardly of said pool, a control, means to convey the water from said overflow gutter and said main-drain outlet into said control, a pipe line to convey the water from said control to said nozzles, and means in said pipe line to force the water under pressure from said nozzles, whereby a current is directed toward said main-drain, substantially as and for the purposes specified.

6. In a circulating system for swimming-pools, an overflow gutter for receiving surface water, a main-drain outlet for receiving water from the bottom of said pool, a plurality of nozzles adjacent said bottom and having fan shape outlets directed inwardly of said pool, a control, means to convey the water from said overflow gutter and said main-drain outlet to said control, a pipe line to convey water from said control to said nozzles, and means in said pipe line to force the water under pressure from said nozzles, whereby currents are directed parallel with said bottom.

7. In a circulating system for swimming-pools, an overflow gutter for receiving surface water, a main-drain outlet for receiving water from the bottom of said pool, a plurality of nozzles adjacent said bottom and having their outlets directed inwardly of said pool, a pit, a strainer for separating said pit in two compartments, means to convey the water from said overflow gutter and said main-drain outlet into one compartment of said pit, a pipe line to convey water from the other side of said pit to said nozzles, means in said pipe line to force the water under pressure from said nozzles, whereby a current is directed toward said main-drain, means in said system to control the flow of water into said pit from said main-water drain, and said last means controlled by the flow of water from said overflow gutter.

8. In a circulating system for swimming-pools, an overflow gutter for receiving surface water, a main-drain outlet for receiving water from the bottom of said pool, an auxiliary drain, a plurality of nozzles adjacent said bottom and having their outlets directed inwardly of said pool, a pit, a strainer for separating said pit in two compartments, means to convey the water from said overflow gutter, said main-drain outlet and said auxiliary drain into one compartment of said pit, a pipe line to convey water from the other side of said pit to said nozzles, means in said pipe line to force the water received from said pit under pressure from said nozzles, whereby a current is directed toward said main-water drain, means in said system to control the flow of water into said pit from said main-water drain, and said last means controlled by the flow of water from said overflow gutter.

9. A circulating system for a swimming-pool including in combination, an overflow gutter surrounding the pool, a main drain outlet at the bottom of said pool, an influent piping system arranged near the bottom of said pool and including a plurality of nozzles having fan-shaped outlets arranged to distribute the water in fan-shaped formations directed inwardly of said pool from the walls thereof, a control, an effluent piping system, including piping to convey the water from said overflow gutter to said control, and piping to convey the water from said main-drain outlet to said control, a pump connected with said control, said control comprising mechanism adapted to regulate the capacity of water received by said pump from said main-drain outlet, the said capacity being dependent upon the capacity of water received by said control from said overflow gutter, and piping to convey the water from said pump to said nozzles.

10. A circulating system for a swimming-pool, including in combination an influent piping system arranged near the bottom of said pool and including a plurality of nozzles having fan-shaped outlets arranged to distribute the water in fan-shaped formations directed inwardly of said pool from the walls thereof, an effluent piping system including piping to convey the water from the said basin and a pump connected with said influent and effluent systems.

11. A circulating system for a swimming-pool basin including in combination, an overflow gutter surrounding the pool, auxiliary drains, a main-drain outlet at the bottom of said pool, an influent piping system arranged near the bottom of said pool and including a plurality of nozzles having fan shaped outlets arranged to distribute the water in fan-shaped formations directed inwardly of said pool from the walls thereof, a control, an effluent piping system, including piping to convey the water from said overflow gutter to said control, and piping to convey the water from said main-drain outlet to said control, a pump connected with said control, and piping to convey the water from said auxiliary drains, said control comprising mechanism adapted to regulate the capacity of water received by said pump from said main-drain outlet, the said capacity being dependent upon the capacity of water received by said control from said overflow gutter, and piping to convey the water from said pump to said nozzles.

12. A circulating system for a swimming-pool, including in combination, an overflow gutter surrounding the pool, a main-drain outlet, an influent piping system and including a plurality of nozzles having fan shaped outlets arranged to distribute the water in fan shaped formations directed inwardly of said pool from the walls thereof, a pump, an effluent piping system including piping to convey the water from said overflow gutter to said pump, and piping to convey water from said main-drain outlet to said pump and to convey the water from said pump to said nozzles.

13. A circulating system for a swimming-pool, including in combination, an overflow gutter surrounding the pool, a main-drain outlet at the bottom of said pool, an influent piping system arranged near the bottom of said pool and including a plurality of nozzles having fan shaped outlets arranged to distribute the water in fan shaped formations directed inwardly of said pool from the walls thereof, a pump, an effluent piping system including piping to convey the water from said overflow gutter to said pump, and piping to convey water from said main-drain outlet to said pump and piping to convey the water from said pump to said nozzles.

14. The combination with a swimming-pool basin having a plurality of nozzles embedded in the walls of said basin at the bottom thereof, and said nozzles having fan-shaped outlets arranged to distribute the water in fan-shaped formations therefrom, and said basin having an overflow gutter near the top thereof, and having a main-drain outlet in the bottom thereof, of a control, piping means to convey the water from said overflow gutter to said control, piping means to convey the water from said main drain outlet to said control, a pump connected with said control, and piping means to convey the water from said pump to said nozzles.

15. The combination with a swimming-pool basin having a plurality of nozzles embedded in the walls of said basin at the bottom thereof, and said nozzles having fan-shaped outlets arranged to distribute the water in fan-shaped formations from said walls inwardly of said basin, and said basin having an overflow gutter near the top thereof, and having a main-drain outlet, of a control, piping means to convey the water from said overflow gutter to said control, piping means to convey the water from said main-drain outlet to said control, a pump connected with said control, and piping means to convey the water from said pump to said nozzles.

16. The combination with a swimming-pool basin having a plurality of nozzles embedded in the walls of said basin at the bottom thereof, and said nozzles having fan-shaped outlets arranged to distribute the water in fan-shaped formations from said walls inwardly of said basin, and said basin having an overflow gutter near the top thereof, and having a main-drain outlet in the bottom thereof, of a control, piping means to convey the water from said main drain outlet to said control, a pump connected with said control, and piping means to convey the water from said pump to said nozzles.

17. The combination with a swimming-pool basin having a plurality of nozzles embedded in the walls of said basin at the bottom thereof, and said nozzles having fan-shaped outlets arranged to distribute the water in fanshaped formations from said walls inwardly of said basin, and said basin having an overflow gutter, and having a main-drain outlet, of a control, piping means to convey the water from said overflow gutter to said control, piping means to convey the water from said main-drain outlet to said control, a pump connected with said control, and piping means to convey the water from said pump to said nozzles.

18. The combination with a swimming-pool basin having a plurality of nozzles embedded in the walls of said basin at the bottom thereof, and said nozzles having fan-shaped outlets arranged to distribute the water in fan-shaped formations therefrom, and said basin having an overflow gutter, and having a main-drain outlet in the bottom thereof, of a control, piping means to convey the water from said overflow gutter to said control, piping means to convey the water from said main drain outlet to said control, a pump connected with said control, and piping means to convey the water from said pump to said nozzles.

19. A circulating system for swimming-pools comprising an influent piping system arranged near the bottom of the basin of said pool and having a plurality of fan-shaped outlets adapted to effect uniform distribution of the water supply to said basin, a control, an effluent piping system consisting of a main-drain having a plurality of openings communicating with said basin below the surface of the pool and said main-drain outlet communicating with said control, auxiliary drains in the side-walk surrounding said basin and communicating with said main-drain through said control, an effluent piping system arranged at the bottom of said pool and communicating with said pool, a pump, piping to convey the water from said effluent systems to said pump, and means to convey the water from said pump to said outlets.

20. A circulating system for swimming-pools comprising an influent piping system arranged near the bottom of the basin of said pool and having a plurality of outlets adapted to effect uniform distribution of the water supply to said basin, a control, an effluent piping system consisting of a main-drain pipe, auxiliary drains in the side-walk surrounding said basin and communicating with said main drain pipe through said control, an effluent piping system arranged at the top of said basin and communicating with said pool, a pump, piping to convey the water from said effluent systems to said pump, and means to convey the water from said pump to said outlets.

21. A circulating system for swimming-pools comprising an influent piping system having a plurality of fan shaped outlets adapted to effect uniform distribution of the water supply to said basin, a control, an effluent piping system consisting of a main-drain communicating with said basin below the surface of the pool, auxiliary drains in the side-walk surrounding said basin and communicating with said main-drain through said control, a pump, piping to convey the water from said effluent systems to said pump, and means to convey the water from said pump to said outlets.

22. A circulating system for swimming-pools comprising an influent piping system arranged near the bottom of the basin of said pool and having a plurality of fan-shaped outlets adapted to effect uniform distribution of the water supply to said basin, a control, an effluent piping system consisting of a main drain pipe and said main-drain outlet communicating with said control, auxiliary drains in the side-walk surrounding said basin and communicating with said main drain pipe through said control, an effluent piping system arranged at the top of said basin and communicating with said pool, a pump, piping to convey the water from said effluent systems to said pump, and means to convey the water from said pump to said outlets.

23. A circulating system for swimming-pools comprising an influent piping system arranged near the bottom of the basin of said pool and having a plurality of fan-shaped outlets adapted to effect uniform distribution of the water supply to said basin, an effluent piping system consisting of a main drain, a pump, piping to convey the water from said effluent system to said pump, and means to convey the water from said pump to said outlets.

24. A circulating system for swimming-pools including in combination an outlet for the surface water of said pool and surrounding the pool, an influent piping system arranged near the bottom of the pool, an effluent piping system arranged near the top of said pool and communicating with said outlet, an effluent piping system arranged at the bottom of said pool and communicating therewith, piping connections, including a pump, establishing communication between said systems, and a common means to receive the water from said effluent piping systems, and means adapted to control the quantity of water delivered from said second mentioned effluent system.

25. A circulating system for swimming-pools including in combination an outlet for the surface water of said pool and surrounding the pool, an influent piping system arranged near the bottom of the pool, an effluent piping system arranged near the top of said pool and communicating with said outlet, an effluent piping system arranged at the bottom of said pool and communicating therewith, and piping connections, including a pump, establishing communication between said systems.

26. A circulating system for swimming-pools including in combination an outlet for the surface water of said pool and surrounding the pool, an influent piping system arranged near the bottom of the pool, an effluent piping system arranged near the top of said pool and communicating with said outlet, an effluent piping system arranged at the bottom of said pool and communicating therewith, piping connections, including a pump, establishing communication between said systems, means to receive the water from said effluent piping systems, automatic means adapted to control the quantity of water delivered over a given period from said second mentioned effluent system to said pump, the said quantity being dependent upon the flow of water received from said first mentioned effluent system.

27. A circulating system for swimming-pools including in combination an outlet for the surface water of said pool and surrounding the pool, an influent piping system arranged near the bottom of the pool, an effluence piping system arranged near the top of said pool and communicating with said outlet, an effluent piping system arranged at the bottom of said pool and communicating therewith, piping connections, including a pump, establishing communication between said systems, means to receive the water from said effluent piping systems, means adapted to control the quantity of water delivered over a predetermined period from said second mentioned effluent system to said pump, the said quantity being dependent upon the quantity of water received over a period from said first mentioned effluent system.

28. In a circulating system for swimming-pools, means for receiving surface water, a main-drain outlet for receiving water from the bottom of said pool, a plurality of nozzles adjacent said bottom and having their outlets directed inwardly of said pool, a control, means to convey the water from said means and said main-drain outlet into said control, a pipe line to convey the water from said control to said nozzles, and means in said pipe line to force the water under pressure from said nozzles, whereby a current is directed toward said main-drain, substantially as and for the purposes specified.

29. In a circulating system for swimming-pools, means for receiving surface water, a main-drain outlet for receiving water from the bottom of said pool, a plurality of nozzles adjacent said bottom and having fan-shaped outlets directed inwardly of said pool, a control, means to convey the water from said first mentioned means and said main-drain outlet to said control, a pipe line to convey water from said control to said nozzles, and means in said pipe line to force the water under pressure from said nozzles, whereby currents are directed parallel with said bottom.

30. In a circulating system for swimming-pools, means for receiving surface water, a main-drain outlet for receiving water from the bottom of said pool, a plurality of nozzles adjacent said bottom and having their outlets directed inwardly of said pool, a pit, a strainer for separating said pit in two compartments, means to convey the water from said first mentioned means and said main-drain outlet into one compartment of said pit, a pipe line to convey water from the other side of said pit to said nozzles, means in said pipe line to force the water under pressure from said nozzles, whereby a current is directed toward said main-drain, means in said system to control the flow of water into said pit from said main-water drain, and said last means controlled by the flow of water from said first mentioned means.

31. In a circulating system for swimming-pools, means for receiving surface water, a main-drain outlet for receiving water from the bottom of said pool, an auxiliary drain, a plurality of nozzles adjacent said bottom and having their outlets directed inwardly of said pool, a pit, a strainer for separating said pit in two compartments, means to convey the water from said first mentioned means, said main-drain outlet and said auxiliary drain into one compartment of said pit, a pipe line to convey water from the other side of said pit to said nozzles, means in said pipe line to force the water received from said pit under pressure from said nozzles, whereby a current is directed toward said main-water drain, means in said system to control the flow of water into said pit from said main-water drain, and said last means controlled by the flow of water from said first mentioned means.

32. A circulating system for a swimming-pool including in combination, a drain surrounding the pool, a main-drain outlet at the bottom of said pool, an influent piping system arranged near the bottom of said pool and including a plurality of nozzles having fan-shaped outlets arranged to distribute the water in fan-shaped formations directed inwardly of said pool from the walls thereof, a control, an effluent piping system including piping to convey the water from said first mentioned drain to said control, and piping to convey the water from said main-drain outlet to said control, a pump connected with said control, said control comprising mechanism adapted to regulate the capacity of water received by said pump from said main-drain outlet, the said capacity being dependent upon the capacity of water received by said control from said first mentioned drain, and piping to convey the water from said pump to said nozzles.

33. A circulating system for a swimming-pool basin including in combination, a drain surrounding the pool, auxiliary drains, a main-drain outlet at the bottom of said pool, an influent piping system arranged near the bottom of said pool and including a plurality of nozzles having fan-shaped outlets arranged to distribute the water in fan-shaped formations directed inwardly of said pool from the walls thereof, a control, an effluent piping system, including piping to convey the water from said first mentioned drain to said control, and piping to convey the water from said main-drain outlet to said control, a pump connected with said control, and piping to convey the water from said auxiliary drains, said control comprising mechanism adapted to regulate the capacity of water received by said pump from said main-drain outlet, the said capacity being dependent upon the capacity of water received by said control from said first mentioned drain, and piping to convey the water from said pump to said nozzles.

WAYNE A. BECKER.